Sept. 30, 1941.  C. E. BOWERS  2,257,155
BATTERY HOLD DOWN MEANS
Filed Feb. 11, 1939

INVENTOR.
Claude E. Bowers
BY A. B. Bowman
ATTORNEY.

Patented Sept. 30, 1941

2,257,155

UNITED STATES PATENT OFFICE 2,257,155

BATTERY HOLD-DOWN MEANS

Claude E. Bowers, Los Angeles, Calif.

Application February 11, 1939, Serial No. 255,951

7 Claims. (Cl. 180—68.5)

My invention relates to a means for holding batteries down in the battery box when used for the electric system of an automobile and the objects of my invention are:

First, to provide a battery holddown means of this class which is applicable for use with various types of battery boxes or battery supports now in use;

Second, to provide a battery holddown means of this class which is adjustable longitudinally for various length batteries;

Third, to provide a means of this class which provides for means for supporting the battery holddown means at various points in connection with the battery support;

Fourth, to provide a battery holddown means of this class in which two duplicate units are used to make up the complete battery holddown means;

Fifth, to provide a means of this class which is readily fabricated out of sheet metal straps which are readily welded together to form the battery holddown means;

Sixth, to provide a battery holddown means of this class which is easy to place in position for supporting the battery and holding it down; and Seventh, to provide a means of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which—

Figure 1:
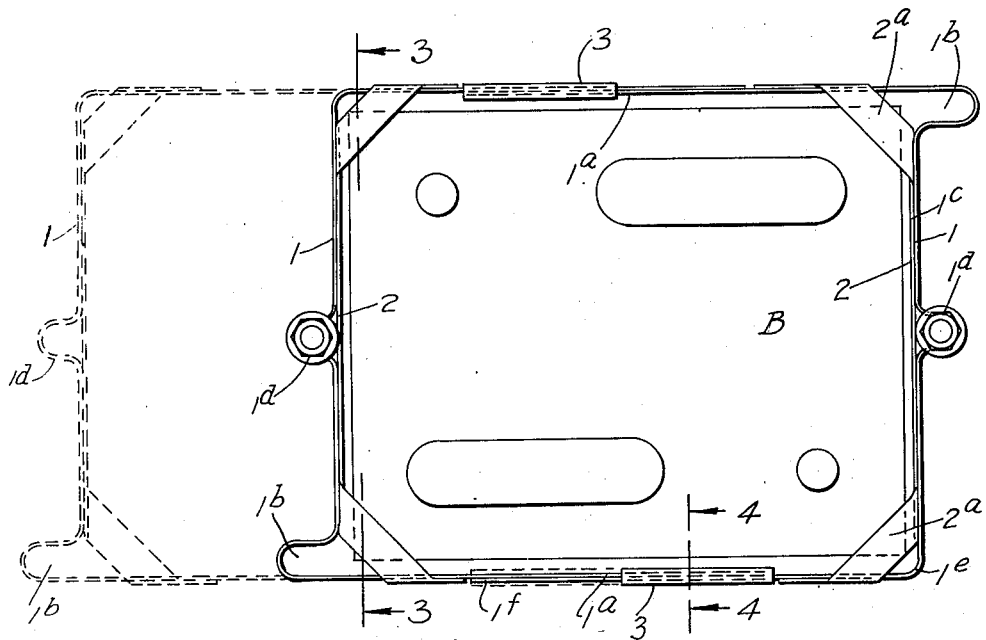
Figure 2:
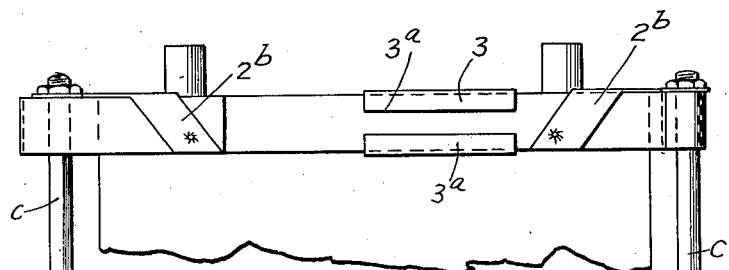
Figure 3:
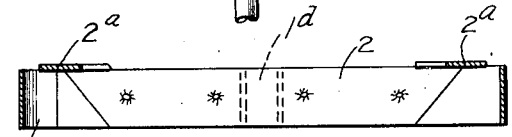
Figure 4:
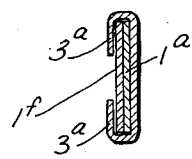

Figure 1 is a top or plan view of my battery holddown means shown positioned in connection with a battery and showing by dash lines a varied adjustable longitudinal position; Fig. 2 is a side elevational view of the battery holddown means shown in position on a fragmentary portion of a battery; Fig. 3 is a sectional view taken from the line 3—3 of Fig. 1, and Fig. 4 is an enlarged sectional view taken from the line 4—4 of Fig. 1.

Similar characters of reference refer to similar parts and portions throughout the several views of the drawing:

The main strap members 1, reenforcing and battery clamp strap members 2 and clip members 3 constitute the principal parts of my battery holddown means.

It will be here noted that the members 1, 2, and 3 are made in duplicate and form the opposite ends of the complete unit for the battery holddown means. The main strap members 1 are made of strap metal substantially seven-eighths of an inch wide by one-sixteenth inch thick. On the end 1a is secured a clip member 3 which is formed of strap metal of substantially the same thickness as the member 1. Secured on the end 1a of the member 1 is a clip member 3 which is made of strap metal substantially the same thickness as the member 1 and is provided with a longitudinal space of substantially double the thickness and with its ends lapping over at 3a on the opposite side as shown best in Figs. 2 and 4 of the drawing. This member 1 is provided with a substantially right angle bend in which is incorporated a loop member 1b which is adapted to receive the bolt for holding the battery down in some types of battery support or boxes and the right angle turned portion 1c is provided with a central loop portion 1d, then extends to the other corner of the battery and is provided with a right angle turn 1e after which the end terminates at 1f. Positioned against the inner side of the portion 1c of the member 1 and extending substantially the full width of the battery is the reenforcing and battery clamp strap member 2 which is substantially the same width and thickness as the member 1 and made of similar material and is secured to the inner side by spot welding or otherwise. It is provided with opposed upwardly and angularly positioned integral portions 2a, somewhat narrower than the main body, which extend diagonally across the corners of the member 1 and form a means for engaging the upper corners of the battery B and its ends extend down over the outer sides of the member 1 at the opposite side by integral portions 2b shown best in Fig. 2 of the drawing and member 1 is spot welded to the member 2 at its extended ends. It will be noted that all of these members in their assembled form are rigidly secured together by spot welding or otherwise.

The operation of my battery holddown means is substantially as follows:

The two end members are made up in assembled form as herein described and they are positioned in the reversed relation, end to end and the ends 1f are inserted in the clip members 3 beside the ends 1a and are telescoped together to a position to fit the battery, as shown best in Figs. 1 and 2 of the drawing. If the battery clamping bolts C are in the center, these bolts are placed through the loops 1d, washers placed over the upper edges and the nuts screwed tightly thereon. If the battery bolts are at the corners, the bolts are placed through the loops 1b and the washers and nuts positioned over the upper edges as described. The members 2a engage the upper corners of the battery and hold the battery rigidly in position.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a battery holddown means of the class described, the combination of a pair of interchangeable duplicate end members shiftably connected together at their opposite sides and each provided with loops extending outwardly therefrom at its side, each of said members provided with diagonal members extending across its corners adapted to engage the corners of the battery, and clip means secured to each of said end members for receiving the opposite end member whereby they are telescopically connected together at their opposite sides.

2. In a battery holddown means of the class described, a rectangularly shaped open frame provided with diagonal cross members at the corners integrally connected therewith and loop members extending outwardly from opposite sides and corners of said frame.

3. In a battery holddown means of the class described, a rectangularly shaped open frame provided with diagonal cross members at the corners integrally connected therewith and loop members extending outwardly from opposite sides and corners of said frame, said frame being made of two parts and separable and readily shiftable at the sides.

4. In a battery holddown means of the class described, a rectangularly shaped open frame provided with diagonal cross members at the corners integrally connected therewith and loop members extending outwardly from opposite sides and corners of said frame, said frame being made of two parts and separable and readily shiftable at the sides, and each provided with overlapped end portions at the opposite sides.

5. In a battery holddown means of the class described, the combination of a plurality of substantially right angled similar main strap members vertically disposed from edge to edge, clamp holddown strap members positioned across the corners of each of said main strap members and clip members in which the ends of said main strap members are telescopically mounted and freely movable in said clip members at all times.

6. In a battery holddown means of the class described, the combination of a plurality of substantially right angled similar main strap members vertically disposed from edge to edge, clamp holddown strap members positioned across the corners of each of said main strap members, clip members in which the ends of said main strap members are telescopically mounted and freely movable in said clip members at all times, and loop portions in cooperative relation with said main strap members intermediate the corners of said battery holddown means.

7. In a battery holddown means of the class described, the combination of a plurality of substantially right angled similar main strap members vertically disposed from edge to edge, clamp holddown strap members positioned across the corners of each of said main strap members, clip members in which the ends of said main strap members are telescopically mounted and freely movable in said clip members at all times, loop portions in cooperative relation with said main strap members intermediate the corners of said battery holddown means, said clip members being channel shaped and freely shiftable in relation with said strap members.

CLAUDE E. BOWERS.